United States Patent [19]

Frost

[11] 4,295,706
[45] Oct. 20, 1981

[54] COMBINED LENS CAP AND SUNSHADE FOR A CAMERA

[76] Inventor: George H. Frost, 544 Ivan Dr., Kent, Ohio 44240

[21] Appl. No.: 61,840

[22] Filed: Jul. 30, 1979

[51] Int. Cl.³ .............................................. G02B 11/04
[52] U.S. Cl. ..................................................... 350/58
[58] Field of Search ...................... 354/211, 187, 190; 350/58, 65, 245, 57, 60-64, 257, 255, 78

[56] References Cited

U.S. PATENT DOCUMENTS

| | | | |
|---|---|---|---|
| 2,352,844 | 7/1944 | Loebe | 350/58 |
| 2,431,172 | 11/1947 | Harrison | 350/58 |
| 3,572,905 | 3/1971 | Schlapp | 350/58 |
| 3,715,149 | 2/1973 | Freeland | 350/65 |
| 3,774,992 | 11/1973 | Steiner | 350/58 |
| 4,045,117 | 8/1977 | Lerner | 350/65 |

FOREIGN PATENT DOCUMENTS 958760  9/1964  United Kingdom .................. 350/58

*Primary Examiner*—John K. Corbin
*Assistant Examiner*—B. Wm. de los Reyes
*Attorney, Agent, or Firm*—Hamilton, Renner & Kenner

[57] ABSTRACT

A combined lens cover (15) and sunshade (14) for a camera (10) having a generally tubular mount (11) extending around and outwardly of the lens (12) includes a ring (20) attachable to the tubular mount (11). The sunshade (14) is movable from a first position around the mount (11) to a second position outward thereof. The lens cover (15) is movable from a first position covering the lens (12) to a second position exposing the same. Means (34) are provided to connect the ring (20) to the sunshade (14) to maintain the lens cover (15) in its first and second position. Additional means (26) are provided to connect the ring (20) to the lens cover (15) to move the lens cover (15) from the first to the second position.

11 Claims, 10 Drawing Figures

COMBINED LENS CAP AND SUNSHADE FOR A CAMERA

TECHNICAL FIELD

This invention relates to a combined lens cover and sunshade for a camera. More particularly, this invention relates to a device which when in a retracted position covers and protects the lens of a camera without unduly increasing the size thereof and when in an extended position acts as a sunshade for optimum photography purposes.

BACKGROUND ART

Most photographers, including amateur photographers, utilize a lens cover when the camera is not in use to protect the lens from scratching, dirt, direct exposure to the sun, and the like. Such covers are usually solid disk-like members which either snap onto or screw onto the tubular lens housing or mount. The more ardent amateur photographer also often utilizes, as an accessory, a sunshade to prevent glare or light scattering primarily during outdoor photography. These devices can take on many configurations but are typically cylindrical or conical in nature and extend outwardly from and surround the lens to shade the same. Quite often these devices are, like the lens cap, threaded or snapped onto the lens housing or mount.

The separate nature of these accessories can cause the photographer difficulties and/or inconveniences. While the lens cap, when in place, will usually fit with the camera in a camera case, most separate sunshades will not thus necessitating a separate carrying means for the sunshade. In addition, the lens cap must be removed and set aside before any photograph can be taken. This not only gives rise to frequent misplacing of lens caps but it also often times causes the photographer to lose time and potentially miss the picture he wanted. If a sunshade would be desirable for such a quick-action picture, it would be next to impossible to remove the lens cap and mount the sunshade in time to snap such a picture.

Thus, the desirability of combining a lens cap and sunshade and providing some type of facile operation of the two is evident. Certain attempts have been made in that direction, such being typified by U.S. Pat. No. 3,715,149. In that patent a combined lens cap and sunshade is threaded onto the tubular lens mount and held in place by a set screw. Rotation of the sunshade on some additional threads opens and closes the lens cover. In addition to involving a number of working parts which must be precisely and expensively manufactured for use only with a lens mount having threads, the device of this patent is impractical because it constantly protrudes from the camera thereby prohibiting the storage of the camera in its case. Further, the set screw mounting does not fascilitate instantaneous removal if a photograph without the sunshade is desired nor instantaneous mounting if the converse is true. Another typical patent, U.S. Pat. No. 3,909,107, suffers from the same deficiencies. There too the device is suited only for cameras having threaded mounts and it at all times, when mounted on the camera, extends outwardly therefrom. In short, none of the prior art devices of which I am aware successfully combine a sunshade and lens cap into a unit which is readily attachable to or dismountable from a camera, economically and efficiently manufactured, and retractable, while mounted, so as to not inconveniently protrude from the camera.

DISCLOSURE OF THE INVENTION

It is thus a primary object of the present invention to provide a combined lens cap and sunshade for a camera which conforms to the size and shape of the tubular lens mount thereby fitting in a conventional camera case.

It is another object of the present invention to provide a device, as above, which is easily mountable on and detachable from the tubular lens mount and one which does not require any additional element to hold the device to the mount.

It is a further object of the present invention to provide a device, as above, which in one easy motion can be converted from a lens cover to a sunshade.

It is yet another object of the present invention to provide a device, as above, which can act as a shock absorber for the camera.

It is an additional object of the present invention to provide a device, as above, which is economically manufactured with a minimum of parts.

These and other objects of the present invention, which will become apparent from the description to follow, are accomplished by the means hereinafter described and claimed.

In general, a combined lens cover and sunshade for a camera of the type having a generally tubular mount extending around and outwardly of the lens includes a ring member attachable to the tubular mount. A sunshade device is movable from a first position around the tubular mount to a second position outward of the tubular mount, the device acting as a sunshade when in the second position. A lens cover is movable from a first position covering the lens to a second position exposing the lens. Means are provided which connect the ring member to the sunshade to maintain the lens cover in its first and second positions. Further means are provided which connect the ring member to the lens cover to move the lens cover from the first to the second position.

PREFERRED EMBODIMENTS FOR CARRYING OUT THE INVENTION

Figure 1:
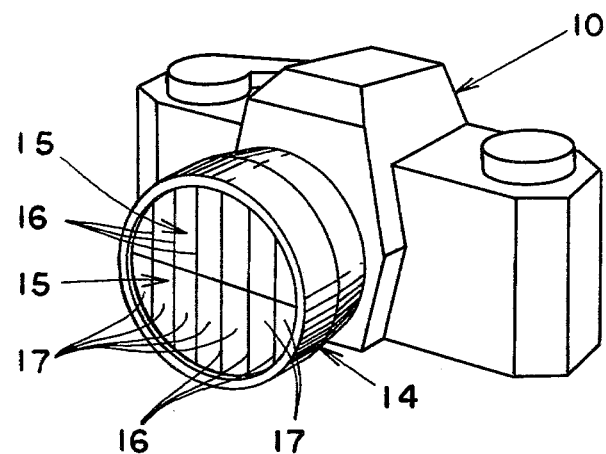
FIG. 1 is a perspective view of a somewhat schematically shown camera having the combined lens cover and sunshade device according to the concept of the present invention mounted thereon with the sunshade retracted and the lens cover closed.
Figure 2:
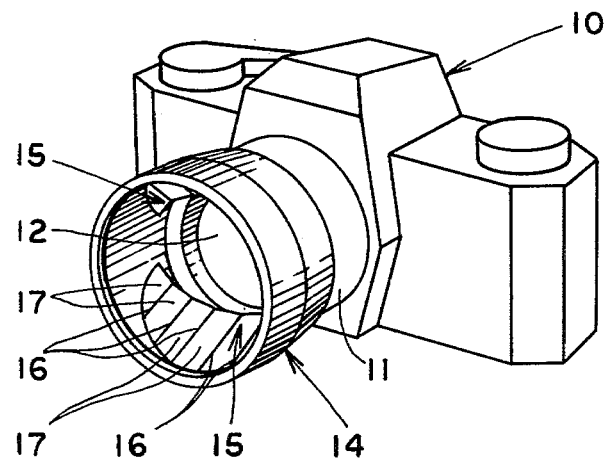
FIG. 2 is a perspective view of a somewhat schematically shown camera having the combined lens cover and sunshade device according to the concept of the present invention mounted thereon with the sunshade extended and the lens cover open.
Figure 3:
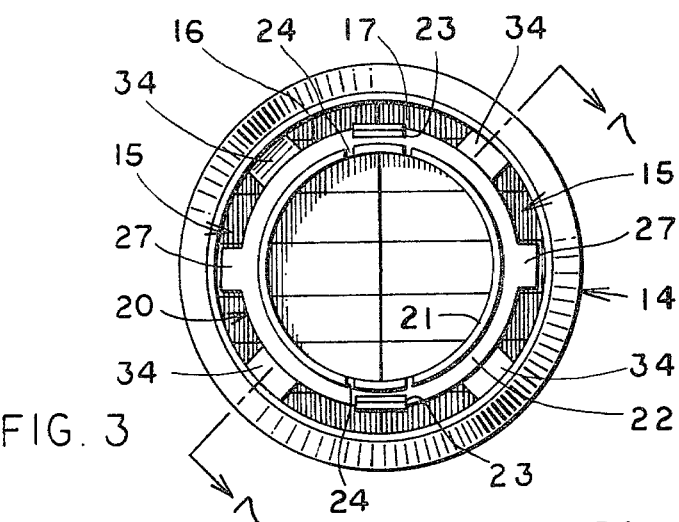
FIG. 3 is a rear elevational view of the combined lens cap and sunshade according to the concept of the present invention showing the lens cap in a closed position.
Figure 4:
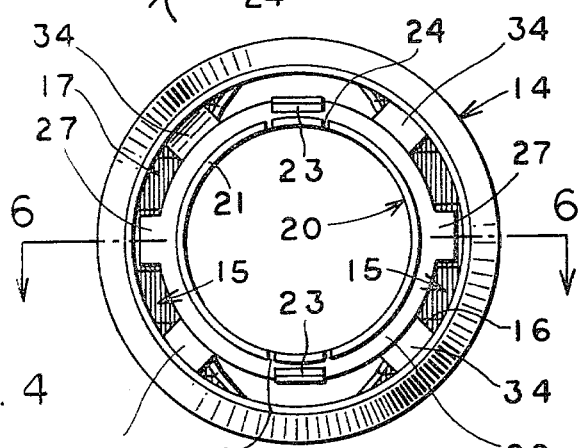
FIG. 4 is a rear elevational view similar to FIG. 3 but showing the lens cap in an open position.
Figure 5:
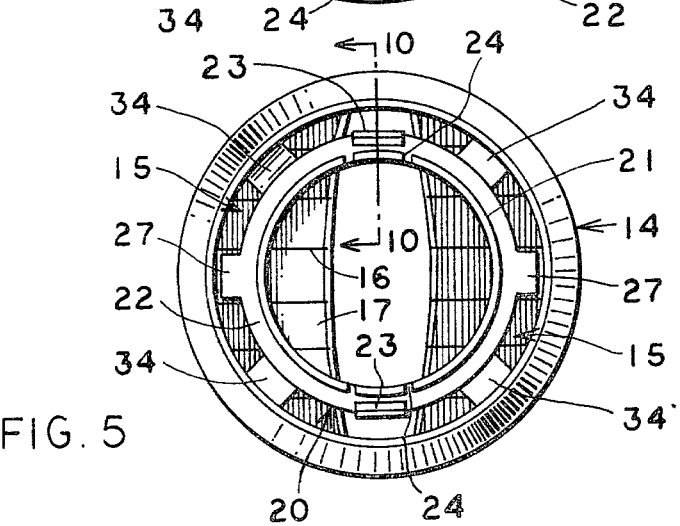
FIG. 5 is a rear elevational view similar to FIGS. 3 and 4 but showing the lens cap in a partially open position.

A conventional camera is indicated generally by the numeral 10 and somewhat schematically shown in FIGS. 1 and 2. Camera 10 includes a tubular lens mount 11 (FIG. 2) extending around a conventional lens 12. The inside of the outer portion of tubular lens mount 11 is usually threaded for receiving various camera adjuncts such as filters and the like.

The sunshade portion of the present invention is indicated generally by the numeral 14 and is shown as somewhat conical in nature flaring outward to a cylindrical portion, although the entire sunshade 14 could be cylindrical without departing from the spirit of the invention. Sunshade 14 is preferably and conveniently molded out of a durable plastic material and is of a diameter preferably only slightly larger than that of conventional lens mount 11 so that when in the retracted position shown in FIG. 1, sunshade 14 fits around lens mount 11. As shown in FIG. 2, when sunshade 14 is in its extended position outward of camera 10, it provides a tunnel-like opening for lens 12 thereby shading it from the sun.

Figure 9:
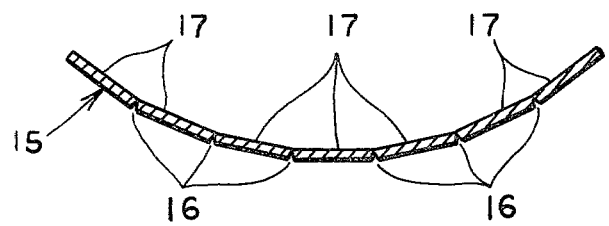
FIG. 9 is an enlarged sectional view taken substantially along line 9—9 of FIG. 6.

The lens cap portion of the present invention is shown as including two generally semicircular segments or doors, indicated generally by the numeral 15. Doors 15 can be molded of a plastic material and, as best shown in FIG. 9, have a plurality of weakened areas 16 extending the majority of the way through the door to define a plurality of panels 17. Thus, doors 15 will bend at weakened areas 16 as the lens cover is being moved from the closed position of FIG. 1 to the open position of FIG. 2. In the open position the doors will be able to conform to the arcuate sunshade 14 and thereby be out of the way of the lens 12. In the closed position the doors are confined by an annular ring member 18 (FIG. 6) which has a lip 19 extending radially inward against which doors 15 may rest.

Figure 8:
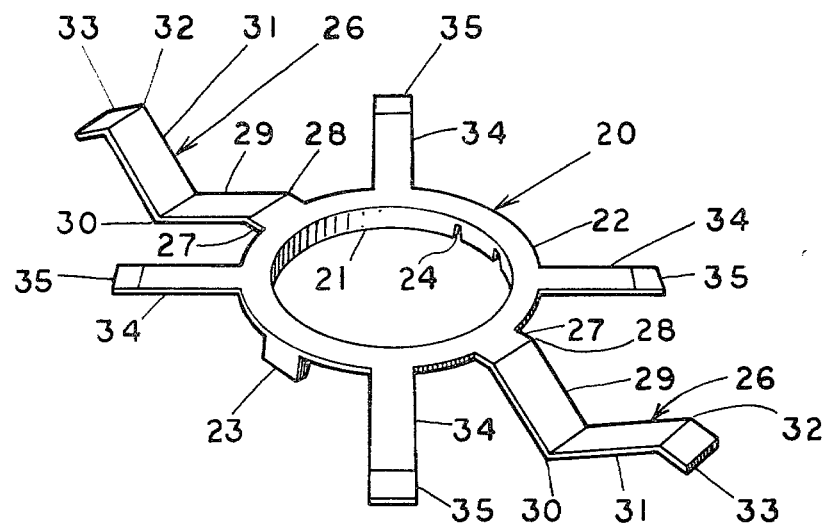
FIG. 8 is a perspective view of a portion of the combined lens cap and sunshade according to the concept of the present invention.
Figure 10:
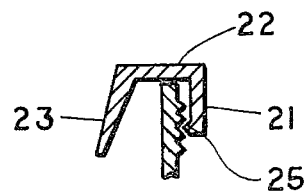
FIG. 10 is a sectional view taken substantially along line 10—10 of FIG. 8 shown in conjunction with the tubular lens mount of a camera.

The manner in which the device mounts on the camera is best shown in FIGS. 8 and 10. A ring member, which can be made of a plastic material, is indicated generally by the numeral 20 and includes an axially directed portion 21 of a diameter generally corresponding to the internal diameter of lens mount 11 and a radially directed portion 22 extending radially outward from portion 21. Radially directed portion 22 is provided with two release and lock tabs 23. Adjacent each tab 23, axially directed portion 21 is shown as being interrupted in two locations, as at 24, to accommodate flexing of portion 21 of ring member 20. The axially inner end of portion 21 of ring member 20 is provided with a barb 25 designed to catch onto the internal threads of tubular lens mount 11. Radially inward pressure on tabs 23, as by the user's fingers, will flex portion 21 of ring 20 at and adjacent interrupted areas 24 and readily release it from the lens mount. Similar pressure will allow portion 21 of ring 20 to fit within the lens mount 11 with subsequent release of tab 23 locking ring 20 on the mount 11.

Figure 6:
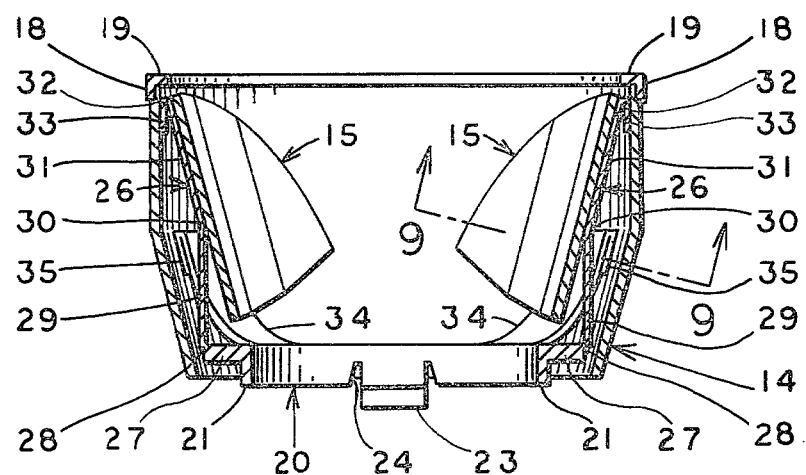
FIG. 6 is a sectional view taken substantially along line 6—6 of FIG. 4.

Doors 15 are attached to ring member 20 by means of hinges indicated generally by the numeral 26 in FIG. 8. Two tabs 27 extend radially outward from ring 20 and carry one end of hinges 26. Hinges 26 may be made of a flexible plastic material such as polypropylene used to make what is commonly known as a "living hinge" and may be attached to tabs 27 as by sonic welding, heat sealing or the like. The outer edge of tabs 27 define a first pivot point 28 for hinges 26. A first pivot arm 29 for each hinge 26 extends from first pivot point 28 to a second pivot point 30. A second pivot arm 31 is attached along its entire length to one panel 17 of each door 15. Second pivot arm 31 terminates at a third pivot point 32 from which extends a mounting tab 33. Tab 33 may be attached to sunshade 14 or ring 18 or may be attached between the two, but is shown in FIG. 6 as being attached to sunshade 14. With the doors 15 fully closed, pivot points 28 and 30 are folded to their greatest extent with first pivot arm 29 being folded against second pivot arm 31 thus placing ring 20 adjacent doors 15. As will hereinafter be explained in more detail, the doors are opened by moving sunshade 14 outward. As shown in FIG. 6, the doors pivot downward on third pivot point 32 as pivot arm 29 effectively pulls the doors open, pivoting on second pivot point 30 almost 180°. Similarly, pivot arm 29 pivots on first pivot point 28 effectively 90° of tab 27.

Figure 7:
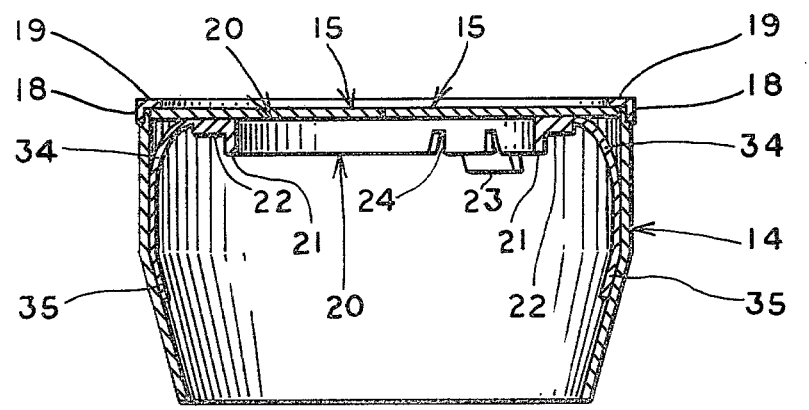
FIG. 7 is a sectional view taken substantially along line 7—7 of FIG. 3.

In order to maintain the doors in either the open or closed position four over-the-center type spring members 34 are provided. These too may be of a flexible plastic material and are attached to ring 20 as by sonic welding, heat sealing or the like. Spring members 34 are similarly attached at their other end to the inside of sunshade 14 preferably at approximately midway of its length. Tabs 35 may be provided for this attachment. As shown in FIG. 7 with doors 15 in the fully closed position, springs 34 tend to push ring 20 upward against the doors to maintain them closed. At this time also the flexibility of springs 34 tends to cushion the camera should it be bumped near the area of the lens. As the lens cover is opened up by moving sunshade 14 away from the camera (upward in FIG. 7) the bias of springs 34 is overcome and they begin to flex, move through their neutral point, and end up as shown in FIG. 6 now holding the sunshade outward and thus the lens cover open.

It should thus be evident that the combined lens cover and sunshade described herein substantially improves the art and otherwise accomplishes the objects of the present invention.

I claim:

1. A compact and collapsible sunshade and lens cover for a camera having a tubular mount extending around and outwardly of the lens of the camera comprising ring means attachable to the tubular mount, sunshade means collapsible from a first position outward of the tubular mount to a second position around the tubular mount to be compact therewith, lens cover means movable from a first position exposing the lens to a second position covering the lens as said sunshade means is being collapsed, means connecting said ring means to said sunshade means to maintain said lens cover means in said first and second positions, and means connecting said ring means to said lens cover means to move said lens cover means from said first to said second position.

2. A compact and collapsible sunshade and lens cover according to claim 1 wherein said ring means includes barb means engagable with the inside of the tubular mount, and lock and release tab means to flex said ring means and selectively engage and disengage said barb means with the tubular mount.

3. A compact and collapsible sunshade and lens cover according to claim 2 wherein at least one portion of said ring means is interrupted to aid in the flexing thereof.

4. A compact and collapsible sunshade and lens cover according to claim 1 wherein said lens cover means includes two generally semicircular doors which are together in said second position and which are separated in said first position.

5. A compact and collapsible sunshade and lens cover according to claim 4 wherein said doors include a plurality of weakened areas defining panels therebetween, said doors bending at said weakened areas when moving from said second position to said first position.

6. A compact and collapsible sunshade and lens cover according to claim 1 wherein said means connecting said ring means to said sunshade means includes a plurality of spring members.

7. A compact and collapsible sunshade and lens cover according to claim 6 further comprising an annular ring member attached to the outer edge of said sunshade means to hold said lens cover means in said second position against the bias of said spring members.

8. A compact and collapsible sunshade and lens cover according to claim 1 wherein said means connecting said ring means to said lens cover means includes hinge means to guide said lens cover means from said second to said first position.

9. A compact and collapsible sunshade and lens cover according to claim 8 wherein the point of connection between said hinge means and said ring means defines a first pivot point, said hinge means including a first pivot arm extending from said first pivot point to a second pivot point, and a second pivot arm extending from said second pivot point and attached to said lens cover means.

10. A compact and collapsible sunshade and lens cover according to claim 9 wherein said hinge means further includes a tab member attached to said sunshade means and extending to a third pivot point at the end of said second pivot arm.

11. A compact and collapsible sunshade and lens cover according to claim 10 wherein said lens cover means includes two doors, there being one said hinge means for each door.

* * * * *